April 12, 1960
J. J. HICKS
2,932,501
WEIGHING APPARATUS
Filed March 11, 1953
2 Sheets-Sheet 1
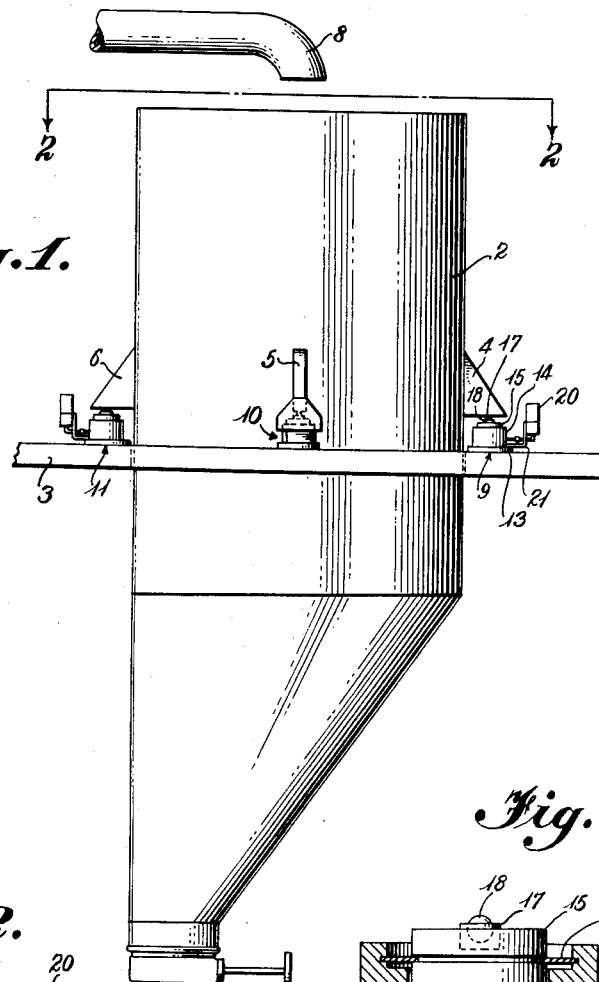
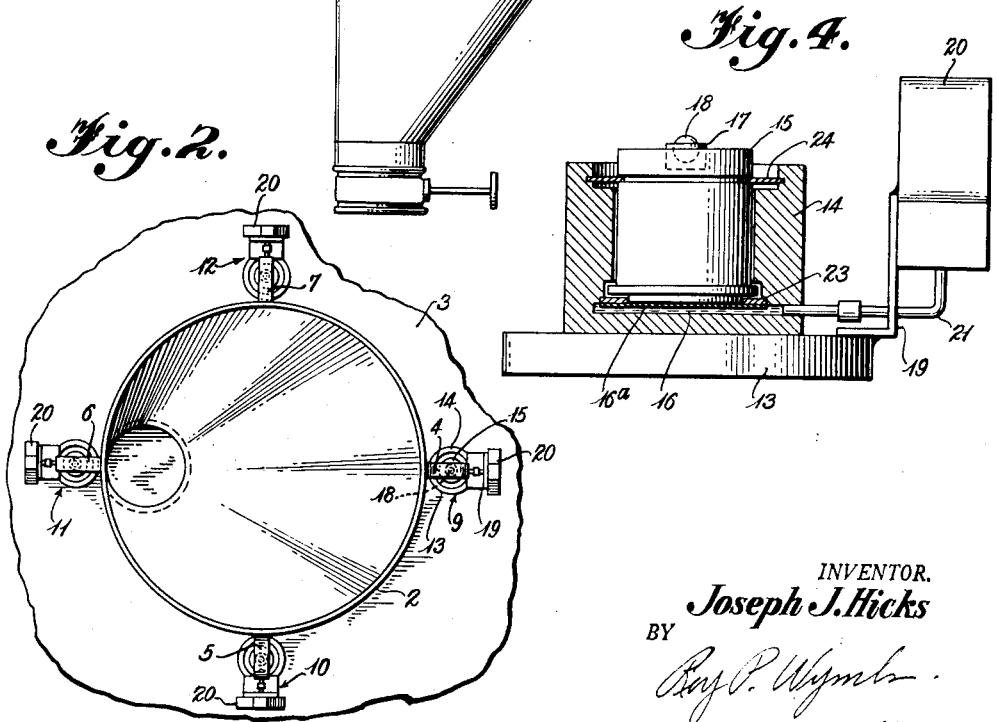
INVENTOR.
Joseph J. Hicks
BY
ATTORNEY April 12, 1960

J. J. HICKS 2,932,501

WEIGHING APPARATUS

Filed March 11, 1953

INVENTOR.
Joseph J. Hicks
BY
ATTORNEY

United States Patent Office 2,932,501
Patented Apr. 12, 1960

2,932,501

WEIGHING APPARATUS

Joseph J. Hicks, Eddystone, Pa., assignor to The Chemstrand Corporation, Decatur, Ala., a corporation of Delaware Application March 11, 1953, Serial No. 341,700

1 Claim. (Cl. 265—47)

This invention relates to a new weighing system or apparatus. More particularly, the invention is concerned with an electrical, automatic and continuous weighing system which indicates or registers the weight figures either locally or remotely from the point of operation.

Various weighing systems are known and presently employed in various process industries. In chemical industries, where it is necesary to handle and weigh corrosive materials, the conventional scale installation has not been entirely satisfactory due to this corrosion problem. In addition, vibration caused by heavy equipment, such as mixers, and the like, has presented a problem. Further, the transmission problems have been acute, that is, the transmission of the weight indication to a central control room. This is further aggravated by the fact there has been an increased desire for the use of remote centralized control in chemical process industries. This desire has emphasized the need for an accurate weight-measuring system capable of providing a transmitted indication which will remain unaffected by ambient temperature variations and transmission lag.

In weighing systems proposed heretofore, hydraulic pressure means have been employed for transmitting weight indications. A single hydraulic load cell has usually been employed which in turn is connected directly to an indicating gauge by means of a tube or tubing. When such tubing is more than a few inches long, the accuracy of the measurement is generally affected by ambient temperature variations and the greater the distance between the cell and gauge, the more pronounced is this temperature effect.

Consequently, with all the corrosion, vibration and transmission difficulties encountered with prior art devices, there has been a great need for a new weighing system to overcome these difficulties.

Accordingly, it is a general object of the present invention to provide a new weighing system or apparatus which is not affected by vibration or corrosion, and which is capable of transmitting weight indications for considerable distances. It is another object of the invention to provide an electrical weighing system or apparatus which is capable of producing a continuous weight indication and which utilizes a hydraulic load cell actuation and an electrical transmission system to indicate and/or record the weight figure either locally or remotely from the point of actuation. It is a specific object of the present invention to provide a multiple cell, electrical automatic weighing system or apparatus which is adapted to weigh continuously, corrosive liquid and solid chemical materials. Other objects and advantages of the present invention will be apparent from the description thereof hereinafter.

In general, the object of the present invention are accomplished by providing a plurality of hydraulic load cells located at symmetrical points to support a large storage tank or like container. Each cell is in turn coupled to a Bourdon tube which receives the change in hydraulic pressure created by the load variations. On the tip of each of the Bourdon tubes there is mounted an armature of a differential electrical transformer. The connections from all the transformers employed are so arranged as to provide a single electrical output indicative of the total weight being measured. The output voltage is then amplified and used to actuate one phase of a small servo motor. The motor is connected by means of a mechanical linkage to a receiving differential transformer and as the motor is actuated, it repositions the armature of the receiving differential transformer, thus restoring electrical balance to the circuit. Also connected to the servo motor is an indicator pointer or recorder pen positioned adjacent a graduated scale. As the motor is actuated the indicator is moved to appropriate position indicating the weight.

If desired, the total weight signal may be re-transmitted, using differential transformers, to a recorder in a central control room. Likewise, the total weight signal can be used for control of the container input or discharge.

In order to more clearly understand the following detailed description of the present invention, reference should be had to the accompanying drawing, which is merely intended to be illustrative and not limitative, and in which;

Figure 1 is a diagrammatic side elevation view illustrating the present invention as employed in connection with a large storage tank or bin;

Figure 2 is a view taken along the line 2—2 of Figure 1;

Figure 4 is a side elevation view, partly in section, of a load cell employed in the apparatus shown in Figure 1.

Figure 3:
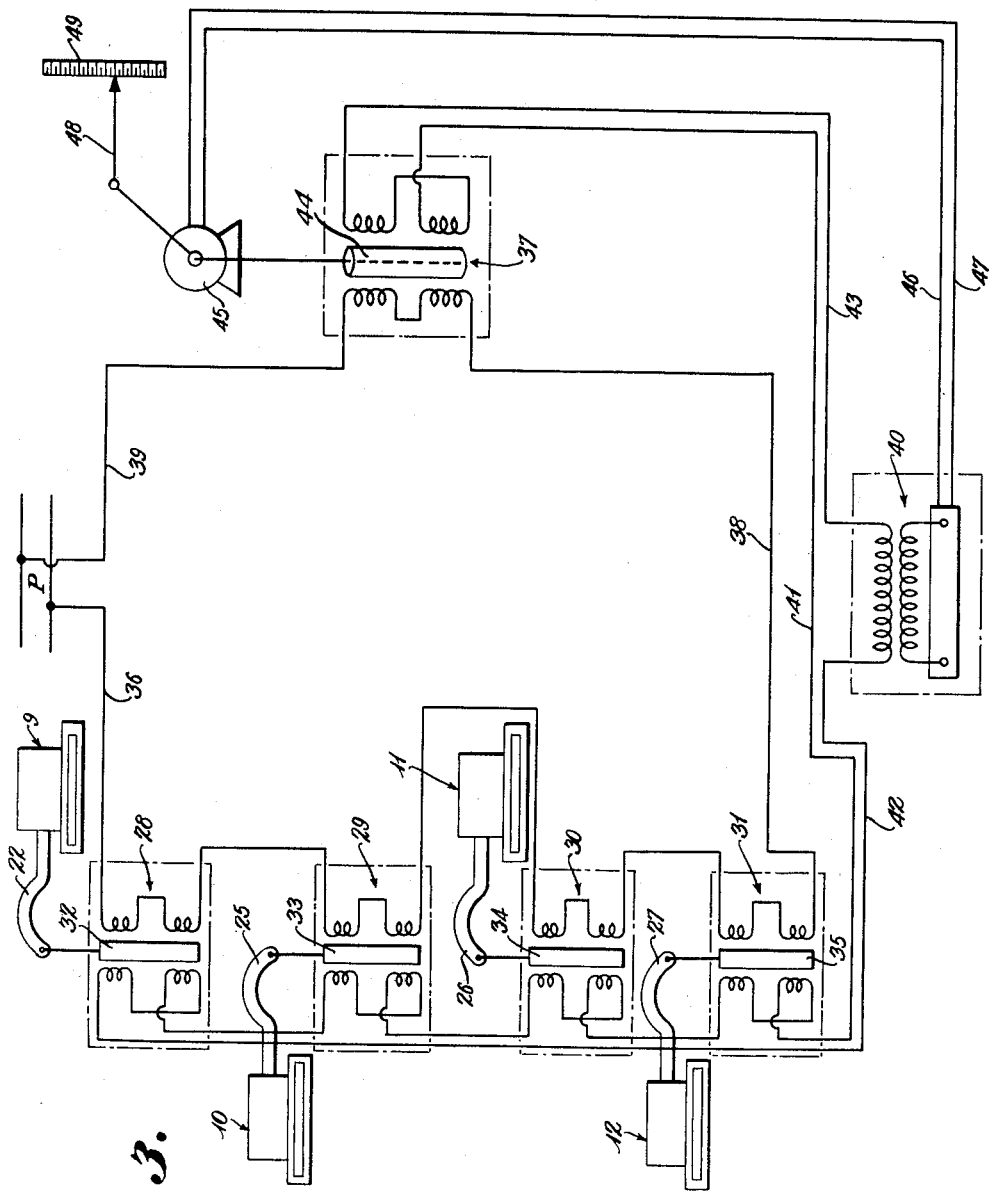
Figure 3 is a diagrammatic view of the electrical circuit employed in connection with the tank shown in Figure 1.

It has been found that the present invention is particularly applicable to the weighing of large amounts of adipic acid as employed in a plant for the manufacture of nylon, and consequently, for the purposes of simplicity of description, the invention will be described as it is applicable thereto. It should be borne in mind, however, that this is merely intended in an illustrative sense and the invention is not to be limited thereby, since the weighing system or apparatus described herein may be employed in any operation where it is desired or necessary to weigh large amounts of a liquid or solid material, either batchwise or in a continuous manner.

Referring particularly to Figure 1, there is shown a large storage tank or bin 2 mounted so as to extend through the floor 3. Fastened to the outside of tank 2 are four supporting members 4, 5, 6 and 7 each having a flat bottom surface (see Figure 2). Material, such as adipic acid, is fed to tank 2 through the pipe or conduit 8. The conduit 8 may have a valve therein if so desired or necessary. More than four, or less than four supporting members may be employed in connection with each container or tank. Generally, however, at least three supporting members are employed in order to equalize the load. In the event that the design of the container mounting will permit, it is possible to employ a single supporting member or cell. For the purpose of increased overload protection, in the event of "bridging" or accumulation of the container's contents over a single point of support, it is preferred to employ four supporting members, such as in the illustrative embodiment shown.

Mounted on the floor 3 and directly under the supporting members 4, 5, 6 and 7 are hydraulic load cells 9, 10, 11 and 12. The supporting members 4, 5, 6 and 7 rest on bearings mounted in the tops of the load cells encased in rubber housings which act as dust covers. Inasmuch as all of the load cells employed are similar, only one will be described in detail. In this connection, reference should be had to Figure 4 wherein there is shown a side elevation of the load cell, partly in section.

The load cell, as shown in Figure 4, has a base 13 mounted on which is a rigid housing or cylinder 14. Extending into the housing 14 is a piston 15, the lower end of which is in contact with a layer of fluid 16, such as oil, and the like. Mounted in the upper end or surface of the piston 15 is a rubber housing 17 encasing a steel ball bearing 18. As pointed out hereinbefore, the rubber housing acts as a dust cover for the bearing 18. The flat bottom surface of the supporting member 4 rests on the bearing 18. The steel ball on the loading platform of the cell reduces the bearing friction between the cell and the load as movement of the load occurs as a result of wind forces on the tank 2.

Mounted on the base 13 is a bracket 19 which supports a housing 20 in which is contained the weight transmitter, described in detail hereinafter. A conduit 21 is connected between the fluid layer 16 and the housing 20. Internally of the housing 20 the conduit is connected to a Bourdon tube 22 (see Figure 3), which is a blind curved elastic tube, oval in section and open at one end to the oil or other fluid beneath the piston, whose pressure is to be registered, and which, upon a variation in pressure, bends anticlastically. Each of the load cells 9, 10, 11 and 12 are of similar construction.

In the present weighing system or apparatus the load cell furnishes an actuating pressure which is proportional to the force of the load being applied. The cell construction includes the rigid cylinder 14 through which the piston 15 operates to exert a pressure on the small volume of hydraulic fluid 16 through the medium of diaphragm 16a (Figure 4). The load is normally applied on the vertical centerline axis of the cell. However, referring to Figure 4, there is employed a bridge-ring 23 and an annular stayplate 24 arrangement which retains piston 15 in a central position in the cylinder and permits application of a full load as much as 10 percent of the cell diameter distant from the center line without measurable decrease in accuracy. The diaphragm 16a is fastened to the bridge-ring 23. The annular stayplate 24 is made of a flexible material, such as flexible metal. The cell may be mounted in any position, vertical or horizontal, convenient for application of the load within this limit.

The dimensions of the load cell will vary with its capacity. For a cell rated at 30,000 pounds, the active diaphragm area or surface of the lower end of the piston is 25 square inches. The fluid layer 16 is not more than 0.005 inch thick, which constitutes an active volume of less than one cubic inch. The travel of the piston under a full load is limited to a few thousandths of an inch, and therefore the problem of deflection which might result from a less rigid measuring system is eliminated. Individual cell capacities will usually range from 5,000 to 100,0000 pounds, depending of course upon the installation, the number of cells employed with each container, and the material being weighed.

Referring to Figure 3, there is shown the electrical hookup used with the embodiment of Fig. 1. The load cells 9, 10, 11 and 12 are shown diagrammatically with Bourdon tubes 22, 25, 26 and 27 connected thereto. In connection with the load cells 9, 10, 11 and 12, there are employed differential transformers 28, 29, 30 and 31 respectively. The armatures 32, 33, 34 and 35 of transformers 28, 29, 30 and 31 respectively, are connected to the ends of Bourdon tubes 22, 25, 26 and 27 respectively. The primary coils of the transmitting transformers are connected in series with one side of a power source P by lead line 36 and to the primary coils of receiving transformer 37 by lead line 38, transformer 37 being in turn connected by lead line 39 to the other side of power source P, thus completing the circuit. A power source of 12 volts is sufficient for the embodiment shown. However, the capacity of the power source may be varied as desired or necessary.

The secondary coils of transformers 28, 29, 30, 31 and 37 are connected in series with amplifier 40 by means of lead lines 41, 42 and 43. The armature 44 of transformer 37 is connected to the servo motor 45, which in turn is connected by lead lines 46 and 47 to amplifier 40. The servo motor is also connected to a pointer 48 which is positioned adjacent a calibrated scale 49.

All of the transformers employed in the instant invention are differentially wound, that is, each contains two primary coils, connected internally in series aiding, and two secondary coils, connected in series opposing. Thus, the voltage output from each transformer is the difference between the two voltages generated in the two secondary coils.

The Bourdon tubes 22, 25, 26 and 27 are bent to form an arc and under an increase in the pressure of their liquid fill, they attempt to straighten out. The curvilinear motion of the tip of the Bourdon tube is transformed by a mechanical linkage (not shown) into a vertical movement and the cylindrical metallic slug or armature, suspended from this linkage, is thereby moved. The armatures or slugs employed in the embodiment shown, are approximately 1½ inches in length and ¼ inch in diameter. In operation, the armature moves vertically through a hole in the core of the transformer.

The electrical inductance of each of the transformer coils varies according to the position of the armature, and the voltage generated by each coil likewise is proportional to the number of turns which enclose the iron armature slug. Therefore, it follows that when the pressure in the Bourdon tube is such that the armature is exactly centered in the transformer windings, the voltage induced in each of the two secondary coils is equal, and since the coils are connected so that these voltages are 180° out of phase and oppose each other, they cancel, and the resultant differential output is zero.

Assuming that such a condition exists at one of the load cell support points and more material is then added to the container, thereby increasing the weight supported by the load cell, the pressure exerted on the Bourdon tube increases and the tube is straightened a proportional amount. In so doing, the linkage moves the armature away from its original position so that it is now enclosed more by one of the secondaries than the other. The voltages generated are unequal, and an output, which is the difference between the two, is transmitted to the receiving transformer 37 through the amplifier 40. The voltage transmitted indicates that the system is out of electrical balance. To restore the balance, the voltage is amplified and used to excite one phase of the small servo motor 45. The second phase of motor 45 is energized continuously from an A.-C. line voltage. Thus energized, the motor turns and through a mechanical linkage the armature 44 of the receiving transformer 37 is set in motion. When the armature arrives at a new position which produces a voltage output from the receiving transformer exactly equal to that being transmitted, the input to the amplifier becomes zero, and the motor ceases to drive.

The motor is capable of forward or reverse motion, depending upon increased or reduced loading of the cells. At the same time that the balancing motor positions the armature of the receiving transformer, it moves the indicating pointer 48 or a recorder pen, if such is employed, to a position on the calibrated scale 49 corresponding to the total weight being measured. A dial, gauge, or the like may be employed in place of scale 49, as desired.

As shown in Figure 3, the voltage changes in each of the four transformers is added together and transmitted to the receiving transformer. Consequently, the voltage change in each transformer need not be equal to each other. Such a system has definite advantages, particularly when weighing granular material in which case the load on one cell may be greater or less than on the others. Further, a simple electrical circuit may be employed to sum up the output voltages from the four points of actuation because the power circuit which provides excitation for the transformers is completely isolated from the signal voltages. Consequently, the arrangement of the secondaries has no effect on the primary voltage. The phase-shifting effect on the transformer output as the armature travels its full range is so negligible that the output signal from the summation circuit is capable of being employed in a null-balance type of receiver-indicator.

The null-balance system of the present invention is relatively unaffected by resistance changes in the connecting leads. The addition of resistance to either the primary or secondary circuit, such as might be created by increasing the length of transmission or by extreme variations in temperature, will have little or no effect on the balancing of the circuit. If the transmission distance is so long that the sensitivity of the system is affected, it can be corrected by increasing the primary voltage. When making connections between components in a null-balance circuit of the type described herein, it is desirable to use twisted pairs for primary circuits and shielded, twisted pairs for secondary circuits where the run exceeds fifty feet. In the present invention, transmitters and receivers up to 5,000 feet apart may be employed. Further, a null-balance system is unaffected by line voltage changes. A combination of a 10 percent line voltage variation and a stray 60-cycle pickup equal to 10 percent of the total signal at full scale would cause only a 1 percent change in reading. In normal systems, however, the stray voltage pickup seldom exceeds 1 percent of the full scale signal.

The maximum load which may be successfully measured by the present invention is determined largely by the design of the load supports. In choosing the number of support points, it is important that the physical properties of the material being weighed be taken into consideration. For example, in a bin or container used for storage of a granular material, such as adipic acid, there is a tendency for the granules to bank or bridge on one side of the bin or container as they are being fed into the container, such as tank 2 in Figure 1, thereby creating a problem of unsymmetrical loading. In such cases, it is necessary that each load cell be capable of supporting the maximum weight which could be expected to exist directly above the support point as a result of the bridging action. In the case of a bin or tank as shown in Figure 1 for the storage of adipic acid in a nylon plant, the same has a diameter of twenty feet and is designed to hold 100,000 pounds of material. Using four load cells, as shown, each must have a capacity of at least 25,000 pounds. The summarizing operation, that is the transmission of the voltage output of the four transformers employed in connection with the load cells, is not affected by the fact that one or more cells may be loaded more heavily than others. All the voltages are summarized and transmitted via the amplifier as a single total voltage to the receiving differential transformer.

Very often transverse forces on the load set up a moment which tends to cause rotation of the piston in the load cell. This force may be caused by windage or expansion due to temperature variations when the bin or tank or container is positioned out of doors, as is usually the case. The bridge ring 23 and stay plate 24 are employed to oppose this moment and under conditions of ordinary application where the moment arm does not exceed the 10 percent of cell diameter limit, the force produced is not serious. In certain installations, where the problem of off-center loading is severe, the present invention is not seriously affected since the loading platform on the top of the loading cell is equipped with a fixed, hardened steel ball, one-half of which protrudes above the platform to provide a bearing point. The supporting members 4, 5, 6 and 7 have flat bottom surfaces which rest upon the steel balls 18 so as to permit the tank 2 to move laterally with respect to the load cells. In operation, the load is free to slide across this bearing point, and the torque action on the piston is reduced considerably, becoming a function of the force of friction and the radius of the ball bearing. In some instances, where space permits, flexure hinges may be employed to limit the transverse motion of the load. These flexure hinges comprise rods which are mounted in pairs at three or more points on the load to form a mechanical couple, alternately in tension and compression. The rods are effective in limiting the sidewise travel of the load without forming support points which would reduce the loading on the cells. It will be readily understood that these flexure hinges must be individually designed for each application.

Inasmuch as the tank 2 may have as much as 500 to 700 square feet of area exposed to the wind, wind effects are considerable. Unless the tank 2 is free to move laterally of the load cells, the lateral force applied to the tank by the wind or by thermal expansion will be transmitted to the load cells. This would result in an erroneous weight reading. Since the bottoms of the members 4, 5, 6 and 7 are flat, these members can roll across the load cells on the balls 18 so that no lateral force can be transmitted to the load cells. Thus, the only force applied to the load cells is the weight of the tank and its contents, and windage and thermal expansion do not affect the weighing operation.

Thus the present invention offers a convenient means of continuously weighing a liquid or solid material and recording or indicating such weight at a remote point, such as a central control room. The invention may be employed with storage containers and also may be used in connection with dispensing materials from containers resting on load cells, such as described herein. Numerous other applications of the present invention will be apparent to those skilled in the art.

It is to be understood that changes and variations may be made without departing from the spirit and scope of the invention as defined in the appended claim.

I claim:

A weighing system, comprising a hopper for storing material to be weighed, support means surrounding the hopper, a plurality of hydraulic load cells mounted on the support means at spaced intervals around the hopper, each of said cells having a fluid chamber and a vertically movable piston having on its upper end a rubber housing rotatably supporting a ball, a plurality of brackets secured to the hopper at spaced intervals therearound, each of said brackets having a flat bottom surface engaging and resting upon one of said balls in such a manner that the hopper is supported by the load cells and is free to move laterally relative to said cells, a plurality of Bourdon tubes each mounted on one of the load cells and communicating with the fluid chamber of said cell in such a manner as to respond to the pressure in said chamber imposed by the piston being acted upon by the weight of the material in the hopper, a plurality of differential transformers each having a movable armature mechanically linked to one of the Bourdon tubes in such a manner that variations in pressure in the fluid chamber move said armature, and electromagnetic means connected to the differential transformers for continuously totalizing the output of all of said transformers.

References Cited in the file of this patent

UNITED STATES PATENTS 1,656,791   Henderson _____ Jan. 17, 1928

(Other references on following page)

UNITED STATES PATENTS

| | | |
|---|---|---|
| 2,341,174 | Bohannan | Feb. 8, 1944 |
| 2,352,935 | Bohannan | July 4, 1944 |
| 2,420,539 | Hornfeck | May 13, 1947 |
| 2,477,854 | Baker | Aug. 2, 1949 |
| 2,494,579 | Pimlott et al. | Jan. 17, 1950 |
| 2,561,321 | Tate | July 17, 1951 |
| 2,571,113 | Crosby | Oct. 16, 1951 |
| 2,579,617 | Schaevitz | Dec. 25, 1951 |
| 2,590,946 | Darling | Apr. 1, 1952 |
| 2,610,052 | Macgeorge | Sept. 9, 1952 |
| 2,680,013 | Flath | June 1, 1954 |
| 2,704,661 | Maugh | Mar. 22, 1955 |

FOREIGN PATENTS

| | | |
|---|---|---|
| 574,901 | France | Apr. 9, 1924 |
| 808,648 | Germany | July 16, 1951 |